(12) United States Patent
Mehlan

(10) Patent No.: US 11,999,393 B2
(45) Date of Patent: Jun. 4, 2024

(54) ARRANGEMENT FOR MONITORING EXTERIOR REGIONS OF A RAIL VEHICLE

(71) Applicant: Siemens Mobility GmbH, Munich (DE)

(72) Inventor: Markus Mehlan, Karlsfeld (DE)

(73) Assignee: Siemens Mobility GmbH, Munich (DE)

( * ) Notice: Subject to any disclaimer, the term of this patent is extended or adjusted under 35 U.S.C. 154(b) by 895 days.

(21) Appl. No.: 17/047,128

(22) PCT Filed: Mar. 27, 2019

(86) PCT No.: PCT/EP2019/057697
§ 371 (c)(1),
(2) Date: Oct. 13, 2020

(87) PCT Pub. No.: WO2019/197161
PCT Pub. Date: Oct. 17, 2019

(65) Prior Publication Data
US 2021/0197874 A1    Jul. 1, 2021

(30) Foreign Application Priority Data
Apr. 11, 2018 (DE) .......................... 102018205459.2

(51) Int. Cl.
*B61L 23/04* (2006.01)
*B61L 15/00* (2006.01)

(52) U.S. Cl.
CPC ........... *B61L 23/041* (2013.01); *B61L 15/009* (2013.01); *B61L 23/04* (2013.01); *B60L 2200/26* (2013.01)

(58) Field of Classification Search
CPC .... B61L 15/00; B61L 15/0081; B61L 15/009; B61L 23/00; B61L 23/04; B61L 23/041; B61L 29/30; B60L 2200/26; H04N 7/181
See application file for complete search history.

(56) References Cited

U.S. PATENT DOCUMENTS 9,592,844 B2 * 3/2017 Porsch ................... G02B 27/01
11,394,885 B2 * 7/2022 Saito ...................... H04N 23/63
(Continued)

FOREIGN PATENT DOCUMENTS

CN   205365409 U  *  7/2016
CN   205365409 U     7/2016
(Continued)

*Primary Examiner* — Zachary L Kuhfuss
*Assistant Examiner* — Cheng Lin
(74) *Attorney, Agent, or Firm* — Laurence A. Greenberg; Werner H. Stemer; Ralph E. Locher

(57) ABSTRACT

An assembly monitors exterior regions of a rail vehicle. In the region of the front side of the rail vehicle, a driver's cab is arranged, which driver's cab has a driver's cab field of view in a first direction of travel. A first lateral region has a first camera system oriented in the direction of travel, which optically captures an angular range along the first lateral region as a first lateral field of view. A second lateral region has a second camera system oriented in the direction of travel, which captures an angular range along the second lateral region as a second lateral field of view. The first and second camera systems are connected to a display device so that image series of the lateral fields of view in the first direction of travel are displayed to the traction vehicle driver in addition to the drivers cab field of view.

7 Claims, 1 Drawing Sheet

(56) References Cited

U.S. PATENT DOCUMENTS

2012/0188346 A1\* 7/2012 Schnabl .................... B61B 1/02
          348/148
2021/0124934 A1\* 4/2021 Ohki ...................... H04N 7/181

FOREIGN PATENT DOCUMENTS

| CN | 205365603 U | | 7/2016 | |
|---|---|---|---|---|
| CN | 106627367 A | \* | 5/2017 | |
| CN | 106627367 A | | 5/2017 | |
| DE | 102004049752 A1 | | 4/2006 | |
| DE | 102007036250 A1 | | 2/2009 | |
| DE | 102014222906 A1 | | 5/2016 | |
| EP | 3125542 A1 | | 2/2017 | |
| EP | 3349440 A1 | | 7/2018 | |
| GB | 2544122 A | \* | 5/2017 | ............ B60R 11/04 |
| WO | WO 2011023602 A1 | | 3/2011 | |

\* cited by examiner

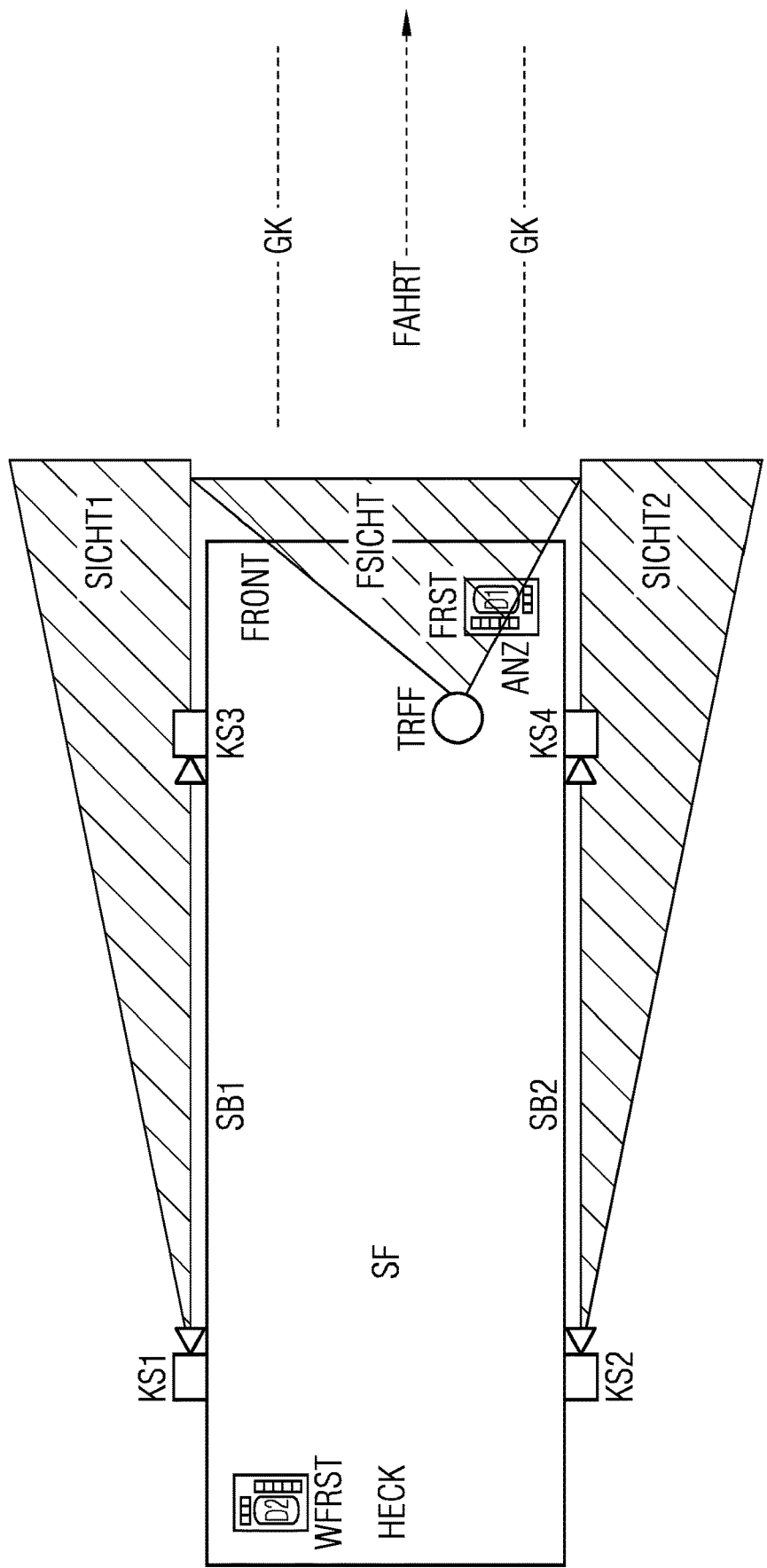

ARRANGEMENT FOR MONITORING EXTERIOR REGIONS OF A RAIL VEHICLE

BACKGROUND OF THE INVENTION

Field of the Invention

The invention relates to an arrangement for monitoring exterior regions of a rail vehicle that cannot be seen by the traction-vehicle engineer, for instance in the course of switching of the rail vehicle. In this regard, the invention addresses, in particular, traction vehicles or locomotives as rail vehicles.

Rail vehicles, and in particular the engineer's cabs thereof, are subject to standardized requirements that leave little creative leeway in the event of a redesign.

Significant influencing factors or requirements in connection with the layout are:
- the field of vision of the traction-vehicle engineer to the outside, by virtue of which the safe travel of the rail vehicle is made possible,
- anthropometric data, with the aid of which ergonomic requirements of the workplace of the traction-vehicle engineer in the rail vehicle are satisfied, and with the aid of which occupational health-and-safety measures in the rail vehicle are accomplished,
- the accommodation of operating devices and display devices within the reach and the visual range of the traction-vehicle engineer,
- crash requirements that are satisfied, for instance, via mechanically configured measures, in order to protect the rail vehicle and also the traction-vehicle engineer thereof in the case of an accident.

These requirements are satisfied by more or less voluminous and stable structural components on the rail vehicle, which reduce the field of vision of the traction-vehicle engineer and also render more difficult the monitoring of exterior regions of the rail vehicle by the traction-vehicle engineer.

Certain ambient regions or exterior regions of the rail vehicle can therefore hardly be seen or cannot be seen by the traction-vehicle engineer. Particularly in situations lacking a clear overview—such as, for instance, in the course of switching trips, in the course of negotiating unprotected grade crossings, etc.—this harbors a great risk of accidents.

With a view to avoiding accidents, circumspect action is expected of the traction-vehicle engineer. The traction-vehicle engineer can, for instance, utilize side windows of the rail vehicle, in order by leaning out of the side window to monitor regions that are not very easy to see or that cannot be seen.

Accordingly, the traction-vehicle engineer is able to monitor, in each instance, only one side of the rail vehicle through the side window and is, in addition, also exposed to bad weather conditions, so that a burden is placed on the health of the traction-vehicle engineer.

SUMMARY OF THE INVENTION

The object of the present invention is to specify an arrangement for improved monitoring of exterior regions of a rail vehicle.

This object is achieved by the features of the independent claim. Advantageous further developments are specified in the dependent claims.

The invention relates to an arrangement for monitoring exterior regions of a rail vehicle that are not very easy to see or that cannot be seen by the traction-vehicle engineer during the operation of the rail vehicle. In this regard the invention addresses, in particular, traction vehicles or locomotives as rail vehicles.

The arrangement includes a rail vehicle of conventional design, which (with reference to a first direction of travel of the rail vehicle) exhibits a front side, a rear side and two side regions.

The front side and rear side are situated opposite one another and arranged or oriented substantially at right angles to the direction of travel.

In a preferred configuration, the front side and rear side are arranged or oriented substantially vertically relative to the railroad embankment of the rail vehicle.

The front side and rear side are connected to one another by the two side regions. The two side regions are situated opposite one another and are arranged or oriented substantially lengthwise relative to the first direction of travel of the rail vehicle.

In a preferred configuration, the two side regions are arranged or oriented substantially vertically relative to the railroad embankment.

An engineer's cab is arranged in the rail vehicle in the region of the front side of the rail vehicle. This engineer's cab has a field of vision that is oriented in the first direction of travel and that is surveyed and utilized by the traction-vehicle engineer in the course of appropriate forward trips, in order to move the rail vehicle in the first direction of travel by sight.

In accordance with the invention, a first side region exhibits a first camera system which is oriented in such a manner that it optically captures or covers an angular range with a branch along the first side region as first lateral field of vision.

The first camera system is connected to a display device in the engineer's cab, so that a series of images of the first lateral field of vision, created in the first direction of travel by the first camera system, is represented on the display device for the traction-vehicle engineer.

As a result, the traction-vehicle engineer is enabled to survey, to inspect and ultimately to monitor, via the display device in the engineer's cab, the first lateral field of vision in addition to the field of vision of the engineer's cab.

A second side region exhibits a second camera system which is oriented in such a manner that it optically captures or covers an angular range with a branch along the second side region as second lateral field of vision.

The second camera system is connected to a display device in the engineer's cab, so that a series of images of the second side region, created in the first direction of travel by the second camera system, is represented on the display device.

As a result, the traction-vehicle engineer is enabled to survey, to inspect and ultimately to monitor, via the display device in the engineer's cab, the second lateral field of vision in addition to the field of vision of engineer's cab.

In a preferred further development, the first lateral field of vision and the field of vision of the engineer's cab overlap one another at least partially.

In a preferred further development, the first camera system is arranged in the side end region and close to the rear side, in order in this way to capture optically an enlarged angular range with a branch along the first side region.

In a preferred further development, the second lateral field of vision and the field of vision of the engineer's cab overlap one another at least partially.

In a preferred further development, the second camera system is arranged in the side end region and close to the rear side, in order in this way to capture optically an enlarged angular range with a branch along the second side region.

As a result, the traction-vehicle engineer is enabled to survey, to inspect and ultimately to monitor, in the engineer's cab, an extended field of vision that encompasses the field of vision of the engineer's cab and the first and second lateral fields of vision.

The statements made above were made with regard to a first direction of travel which will be designated in simplified manner as forward travel.

Accordingly, it is possible for the rail vehicle to make trips in a second direction of travel, opposed to the first direction of travel. This second direction of travel will be designated in simplified manner as reverse travel.

For trips in the second direction of travel, in a preferred further development the rail vehicle exhibits a further engineer's cab in the region of the rear side described above. This further engineer's cab is occupied and utilized by the traction-vehicle engineer in the course of appropriate trips in reverse.

This further engineer's cab also has a further field of vision that in the course of the trips in reverse is oriented so as to correspond to the second direction of travel and that is surveyed and utilized by the traction-vehicle engineer in order to move the rail vehicle by sight.

The first side region then exhibits a third camera system which is oriented in such a manner that it optically captures or covers an angular range with a branch along the first side region as third lateral field of vision.

The third camera system is connected to a display device in the further engineer's cab, so that in the course of the trips in reverse a series of images, created in the second direction of travel by the third camera system, is represented on the display device.

In a preferred further development, the third camera system is arranged in the side end region and close to the front side, described above, in order in this way to capture optically an enlarged angular range with a branch along the first side region.

In a preferred further development, the third lateral field of vision and the further field of vision of the engineer's cab overlap one another at least partially.

The second side region exhibits a fourth camera system which is oriented in such a manner that it optically captures or covers an angular range with a branch along the second side region as fourth lateral field of vision.

The fourth camera system is connected to a display device in the further engineer's cab, so that a series of images, created in the second direction of travel by the fourth camera system, is represented on the display device.

In a preferred further development, the fourth camera system is arranged in the side end region and close to the front side, described above, in order in this way to capture optically an enlarged angular range with a branch along the second side region.

In a preferred further development, the fourth lateral field of vision and the further field of vision of the engineer's cab overlap one another at least partially.

As a result, the traction-vehicle engineer is enabled to survey, to inspect and ultimately to monitor, in the engineer's cab, an extended field of vision that encompasses the further field of vision of the engineer's cab and the third and the fourth lateral fields of vision.

By virtue of the arrangement according to the invention, in the respective first and second directions of travel of the rail vehicle the originally spatially limited respective field of vision of the engineer's cab is substantially extended by two further lateral fields of vision.

As a result, distant exterior regions of the rail vehicle and hence distant regions of the environment of the rail vehicle can be monitored in simplified manner by the traction-vehicle engineer.

By virtue of the transmission of series of images from the camera systems to display devices—for example, to screens—in the respective engineer's cab, the traction-vehicle engineer is able to monitor the exterior regions of the rail vehicle without being exposed to bad weather conditions.

By virtue of a use of standard components in the camera systems, the arrangement according to the invention is capable of being integrated into existing rail vehicles at low cost and in straightforward manner.

By virtue of the arrangement according to the invention, the operational safety is considerably enhanced.

The present invention will be described in the following by way of example on the basis of a drawing.

BRIEF DESCRIPTION OF THE SEVERAL VIEWS OF THE DRAWING

The FIGURE shows an arrangement according to the invention for monitoring exterior regions of a rail vehicle SF.

DETAILED DESCRIPTION OF THE INVENTION

The rail vehicle exhibits a front side FRONT, a rear side HECK and two side regions SB1, SB2.

The front side FRONT and rear side HECK are arranged opposite one another. Both are arranged or oriented at right angles to a first direction of travel FAHRT and substantially vertically relative to the railroad embankment GK of the rail vehicle SF.

The front side FRONT and rear side HECK are connected to one another by the two side regions SB1, SB2. The two side regions SB1, SB2 are situated opposite one another and are arranged or oriented lengthwise relative to the first direction of travel FAHRT of the rail vehicle SF and substantially vertically relative to the railroad embankment GK.

An engineer's cab FRST is arranged in the rail vehicle SF in the region of the front side FRONT of the rail vehicle SF. This engineer's cab FRST has a field of vision FSICHT which is oriented in the first direction of travel FAHRT and which is surveyed and utilized by the traction-vehicle engineer TRFF in the course of forward trips, in order to move the rail vehicle SF in the direction of travel FAHRT by sight.

A first side region SB1 exhibits a first camera system KS1 which is oriented in such a manner that it optically captures or covers an angular range with a branch along the first side region SB1 as first lateral field of vision SICHT1.

The first camera system KS1 is connected to a display device ANZ in the engineer's cab FRST, so that a series of images, created in the first direction of travel by the first camera system KS1, is represented on the display device ANZ.

In a preferred further development, the first camera system KS1 is arranged in the side end region and close to the rear side HECK, in order in this way to capture optically an enlarged angular range with a branch along the first side region SB1.

In a preferred further development, the first lateral field of vision SICHT1 and the field of vision FSICHT of the engineer's cab overlap one another at least partially.

A second side region SB2 exhibits a second camera system KS2 which is oriented in such a manner that it optically captures or covers an angular range with a branch along the second side region SB2 as second lateral field of vision SICHT2.

The second camera system KS2 is connected to the display device ANZ in the engineer's cab FRST, so that a series of images, created in the first direction of travel by the second camera system KS2, is represented on the display device ANZ.

In a preferred further development, the second camera system KS2 is arranged in the side end region and close to the rear side HECK, in order in this way to capture optically an enlarged angular range with a branch along the second side region SB2.

In a preferred further development, the second lateral field of vision SICHT2 and the field of vision FSICHT of the engineer's cab overlap one another at least partially.

In a preferred further development, a further engineer's cab WFRST is arranged in the rail vehicle SF in the region of the rear side HECK of the rail vehicle SF.

This further engineer's cab is occupied and utilized by the traction-vehicle engineer TRFF in the course of trips in a second direction of travel (designated as reverse travel), opposed to the first direction of travel.

Corresponding to the statements made above, the first side region SB1 then exhibits a third camera system KS3 which is connected to a display device in the further engineer's cab WFRST. Series of images created by the third camera system are represented on the display device in the course of trips in reverse.

The second side region SB2 exhibits a fourth camera system KS4 which is connected to the display device in the further engineer's cab WFRST. Series of images created by the fourth camera system KS4 are represented on the display device in the course of trips in reverse.

In the course of trips in reverse in accordance with the statements made above, the camera systems are used to make an extended field of vision available for the traction-vehicle engineer via the camera systems KS3 and KS4 in the course of trips in reverse.

The invention claimed is:

1. A configuration for monitoring exterior regions of a rail vehicle by a traction-vehicle engineer of the rail vehicle, the rail vehicle having a front side, a rear side and two side regions, the front side and the rear side are disposed opposite one another and oriented substantially at right angles to a first direction of travel of the rail vehicle, the front side and the rear side are connected to one another by the two side regions, the two side regions are disposed opposite one another and oriented substantially lengthwise relative to the first direction of travel of the rail vehicle, the configuration comprising:
an engineer's cab disposed in the rail vehicle in a region of the front side of the rail vehicle, in the first direction of travel of the rail vehicle said engineer's cab having a field of vision being surveyed and utilized by the traction-vehicle engineer in a course of trips in the first direction of travel, in order to move the rail vehicle by sight;
a first camera system disposed in a first side region of the two side regions close to the rear side and oriented in the first direction of travel, said first camera system optically capturing an angular range with a branch along the first side region as a first lateral field of vision;
a second camera system disposed in a second side region of the two side regions close to the rear side and oriented in the first direction of travel, said second camera system optically captures an angular range with a branch along the second side region as a second lateral field of vision; and
a display device, said first camera system and said second camera system are connected to said display device in said engineer's cab, so that series of images of the first and second lateral fields of vision, created in the first direction of travel by said first camera system and by said second camera system, are represented on said display device for the traction-vehicle engineer which the traction-vehicle engineer utilizes additionally in order to move the rail vehicle by sight.

2. The configuration according to claim 1, wherein:
the first lateral field of vision and the field of vision of the engineer's cab overlap one another at least partially; and/or
the second lateral field of vision and the field of vision of the engineer's cab overlap one another at least partially.

3. The configuration according to claim 1,
further comprising a further engineer's cab disposed in the rail vehicle in a region of the rear side of the rail vehicle, said further engineer's cab being occupied and utilized by the traction-vehicle engineer in a course of trips of the rail vehicle in a second direction of travel, which is opposed to the first direction of travel, said further engineer's cab having a further field of vision that is oriented in the second direction of travel and that is surveyed and utilized by the traction-vehicle engineer, in order to move the rail vehicle by sight in a course of trips in the second direction of travel;
a third camera system disposed in the first side region and oriented in the second direction of travel, which optically captures an angular range with a branch along the first side region as a third lateral field of vision;
a further display device; and
a fourth camera system disposed in the second side region and oriented in the second direction of travel, which optically captures an angular range with a branch along the second side region as a fourth lateral field of vision, said third camera system and said fourth camera system are connected to said further display device in said further engineer's cab, so that series of images, created by said third camera system and by said fourth camera system in the course of trips in the second direction of travel, are represented on said further display device for the traction-vehicle engineer, which he/she additionally utilizes in order to move the rail vehicle by sight.

4. The configuration according to claim 3, wherein:
the third lateral field of vision and the further field of vision of said further engineer's cab overlap one another at least partially; and/or
the fourth lateral field of vision and the further field of vision of said further engineer's cab overlap one another at least partially.

5. The configuration according to claim 3, wherein:
said third camera system is disposed in a side end region close to the front side; and/or
said fourth camera system is disposed in the side end region close to the front side.

6. The configuration as claimed in claim 1, wherein the rail vehicle is a traction vehicle or a locomotive.

7. A rail vehicle having monitored exterior regions being monitored by a traction-vehicle engineer of the rail vehicle, the rail vehicle comprising:
- a front side;
- a rear side, said front side and said rear side are disposed opposite one another and oriented substantially at right angles to a first direction of travel of the rail vehicle;
- two side regions, said front side and said rear side are connected to one another by said two side regions, said two side regions are disposed opposite one another and oriented substantially lengthwise relative to the first direction of travel of the rail vehicle;
- an engineer's cab disposed in a region of said front side, in the first direction of travel of the rail vehicle said engineer's cab having a field of vision being surveyed and utilized by the traction-vehicle engineer in a course of trips in the first direction of travel, in order to move the rail vehicle by sight;
- a first camera system disposed in a first side region of said two side regions close to the rear side and oriented in the first direction of travel, said first camera system optically capturing an angular range with a branch along said first side region as a first lateral field of vision;
- a second camera system disposed in a second side region of said two side regions close to the rear side and oriented in the first direction of travel, said second camera system optically captures an angular range with a branch along said second side region as a second lateral field of vision; and
- a display device, said first camera system and said second camera system are connected to said display device in said engineer's cab, so that series of images of the first and second lateral fields of vision, created in the first direction of travel by said first camera system and by said second camera system, are represented on said display device for the traction-vehicle engineer which the traction-vehicle engineer utilizes additionally in order to move the rail vehicle by sight.

* * * * *